United States Patent

Kingsbury et al.

[11] 3,751,902
[45] Aug. 14, 1973

[54] APPARATUS FOR INSTALLING INSULATION ON A STAPLE

[75] Inventors: Charles M. Kingsbury, Manchester; Harold S. Colby, Bloomfield, both of Conn.

[73] Assignee: Emhart Corporation, Bloomfield, Conn.

[22] Filed: Feb. 22, 1972

[21] Appl. No.: 227,861

[52] U.S. Cl. .................................. 59/71, 29/203 D
[51] Int. Cl. ............................................ B21d 53/46
[58] Field of Search .................... 59/71, 72, 73, 74, 59/75, 77; 29/203 D, 592

[56] References Cited
UNITED STATES PATENTS

| 548,596 | 10/1895 | Ryan | 59/71 |
| 1,933,152 | 10/1933 | Ryan | 59/71 |
| 2,223,241 | 11/1940 | Ryan | 59/71 |
| 3,032,769 | 5/1962 | Palmer | 59/71 |

*Primary Examiner*—Charles W. Lanham
*Assistant Examiner*—Gene P. Crosby
*Attorney*—John C. Linderman et al.

[57] ABSTRACT

An apparatus for installing insulation on a U-shaped metallic body member to form an insulated staple. The apparatus receives both the U-shaped body member and a section of tubing, and assembles the tubing on the body member so that the staple can be driven into a supporting object and attach a conduit captured by the staple to the object without having direct physical contact between the metallic body member and the conduit. The apparatus assembles insulating tubing on the U-shaped body member so that the portion of the member which receives the blows of a hammer during a stapling operation is openly exposed and the inner periphery of the U-shaped member adjacent the captured conduit is entirely covered by the walls of the tubing which provides the insulating characteristics. The apparatus is adapted to install a standard plastic tubing on a conventional staple body member and, thereby, produces inexpensive, insulated staples efficiently.

21 Claims, 9 Drawing Figures

Patented Aug. 14, 1973

Patented Aug. 14, 1973

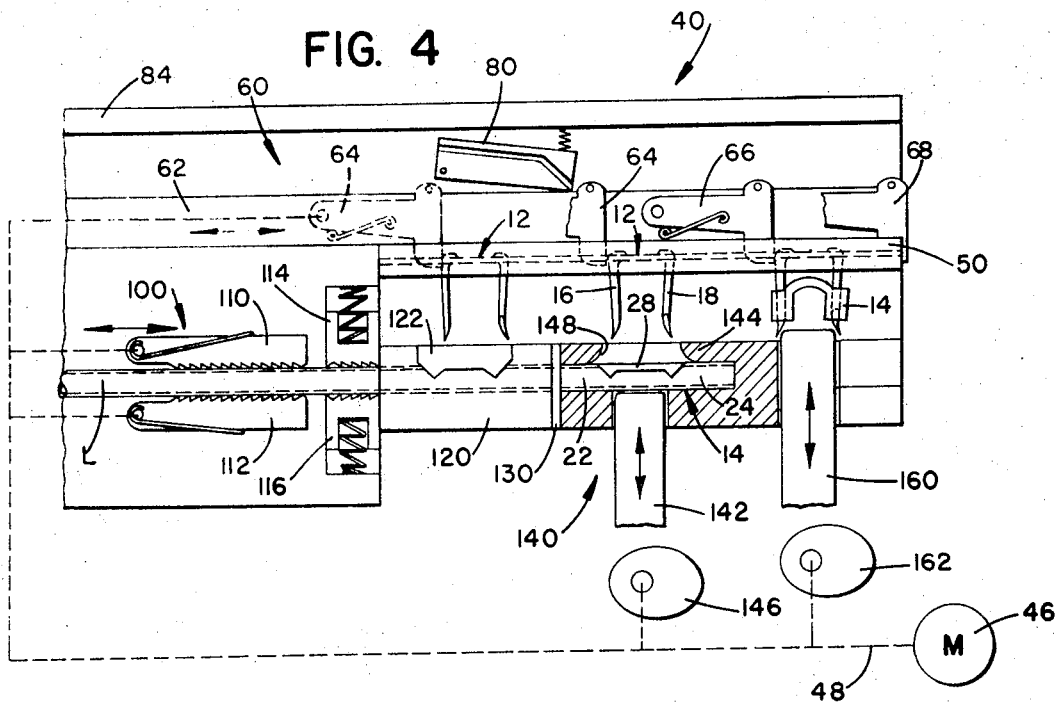
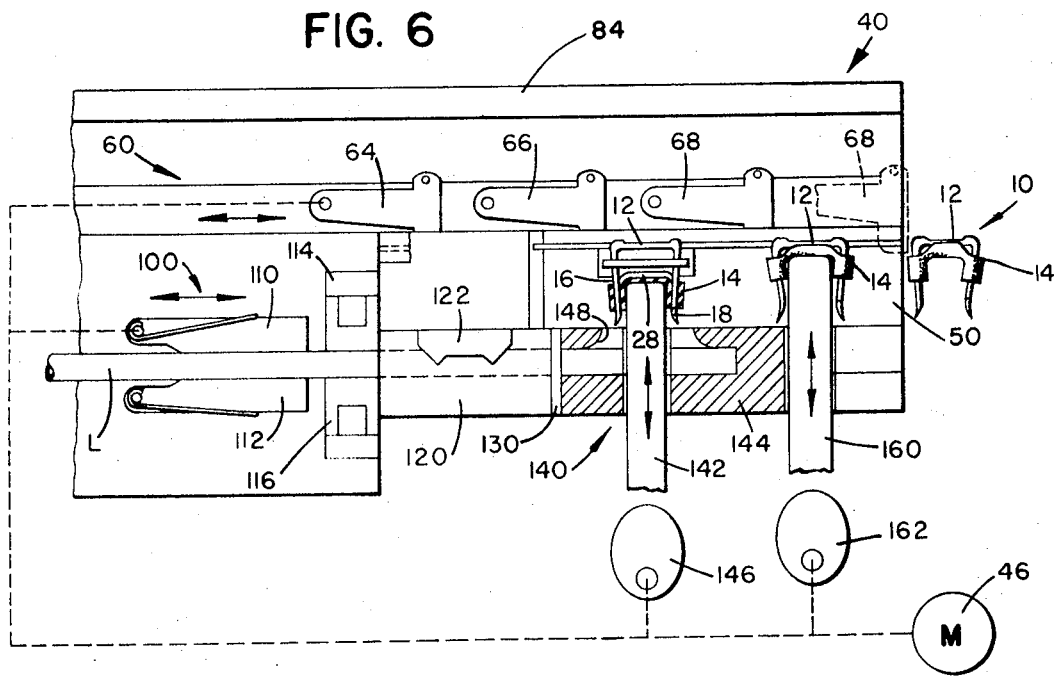

Patented Aug. 14, 1973

Patented Aug. 14, 1973

APPARATUS FOR INSTALLING INSULATION ON A STAPLE

CROSS REFERENCES TO RELATED APPLICATIONS

The subject matter of the present invention is related to subject matter disclosed in a patent application entitled "Insulated Stapling Device and Method of Making the Same" having Ser. No. 227,842 and filed Feb. 22, 1972. The subject matter of the referenced application is incorporated herein by reference.

BACKGROUND OF THE INVENTION

This invention relates to apparatus for making insulated staples of the type used for holding electrical conductors and similar conduits to walls and other supporting objects. More particularly, the invention relates to an apparatus that receives a conventional U-shaped staple body member and installs a section of tubing made from an insulating material on the body member to form an insulated staple.

Insulated staples having a U-shaped configuration are frequently used for mounting electrical or fluid conduits to supporting objects such as walls, beams and similar supporting bases. Examples of such staples are shown in U. S. Pat. Nos. 662,587, 2,351,608 and 2,526,902. Such staples usually employ a metallic body which is covered and spaced from the conduit by an insulating material.

While the prior art staples having insulating characteristics are suitable for their intended purpose, the manufacture of such staples requires specialized insulators and the production and installation of such insulators on the metallic body member is expensive. The apparatus for applying insulation to staples having U-shaped body members depends principally upon the insulator itself and, in most instances, the apparatus is designed specifically for a specially formed insulator or for molding an insulating material directly onto the body member. Sophisticated assembly equipment or specialized molding techniques designed for the installation of the insulators contributes significantly to the cost of the staples. It is also desirable that such apparatus have a continuous operating cycle for the production of large quantities of staples on a continuing basis.

It is, accordingly, a general object of the present invention to disclose an apparatus having a continuous operating cycle for installing a standard type of tubing on a conventional staple of U-shaped configuration to provide an insulated staple at modest cost.

SUMMARY OF THE INVENTION

The present invention resides in an apparatus for installing a section of tubing having insulating characteristics on a conventional staple having a U-shaped body member to impart insulating characteristics to the staple. The apparatus comprises cutting means for removing a longitudinally extending wall portion from a section of tubing made from flexible, insulating material such as a plastic. In removing the wall portion, the cutting means generates a longitudinal opening on one side of the tubing section with a longitudinal dimension no less than the spacing of the parallel legs of the U-shaped body member. Bending means is connected with the cutting means to receive the cut tubing section and to bend the section into a U-shaped configuration corresponding to the U-shaped body member. In the bending process the longitudinal opening acquires a position on the outer periphery of the bent section between the axial ends of the section. Cooperative feeding means simultaneously advances both the U-shaped body member and the tubing section to an assembly station where the projecting ends of the staple legs are located adjacent the longitudinal ends of the opening and register respectively with the axial ends of the bent station. Assembling means are located at the assembly station for urging the projecting ends of the staple legs through the longitudinal opening and out through the respective axial ends of the tubing section. In a preferred form of the invention, the bending means and the assembling means comprise a bending die having a reciprocating punch which not only bends the tubing section in a U-shaped configuration but also translates the section onto the projecting ends of the U-shaped body member.

The apparatus produces an insulated staple by installing a standard tubing on a conventional staple body member in a continuous operating cycle, and the resulting insulated staple is produced without highly specialized molding equipment or preformed insulators.

BRIEF DESCRIPTION OF THE DRAWINGS

FIG. 4 is a side elevation view of the apparatus in FIG. 3 showing the relative positions of the components at one stage of the operating cycle in which a section of tubing is installed on a U-shaped staple body member.

FIG. 6 is another side elevation view of the apparatus similar to the view in FIG. 4 at still another stage of the operating cycle.

DESCRIPTION OF THE PREFERRED EMBODIMENT

Figure 1:
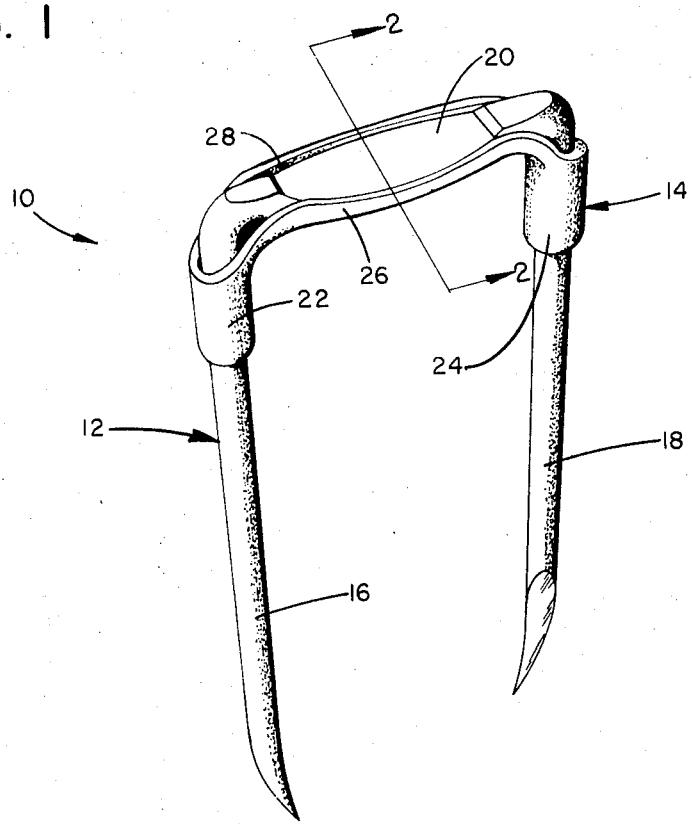
FIG. 1 is a perspective view of an insulated staple formed by the apparatus of the present invention.

FIG. 1 is a perspective view of an insulated staple which the apparatus of the present invention is capable of assembling. The staple, generally designated 10, comprises a U-shaped body member 12 and a sleeve or section of flexible, non-metallic tubing 14 installed on the body member 12 as an insulator. The tubing 14 is preferably formed of a plastic material such as polyvinylchloride or polyethylene and, when installed on the body member 12, provides electrical, thermal and vibrational insulation between the body member 12 and a conduit held by the staple against a supporting base such as a post, wall, ceiling or other mounting object.

The body member 12 is a conventional, non-insulated staple existing in the prior art and is formed as an integral member from a heavy gauge, metallic wire, preferably a steel alloy. The body member 12 has a U-shaped configuration and includes two spaced and parallel legs 16 and 18 joined together at one end by an integrally connecting bridge section 20. The depending ends of the legs 16 and 18 are cut to form pointed tips for easy penetration into a supporting object. The bridge section 20 has a depressed central region which is contiguous at each end with flats generally overlying the upper ends of the legs 16 and 18 to form impacting surfaces for directly receiving the driving forces of a press or the blows of a hammer when the staple is mounted in another object.

The insulating section of tubing 14 has two cylindrically shaped axial end portions 22 and 24 mounted coaxially about the upper ends of the legs 16 and 18 and an intermediate portion 26 joining the end portions 22 and 24 and lining the body member 12 along the inner periphery of the body member between the axial end portions 22 and 24. It will be noted that the intermediate portion 26 has an opening 28 extending longitudinally along one side of the tubing 14 at the outer periphery of the U-shaped body member and the opening 28 has a longitudinal length substantially equal to the spacing between the parallel legs 16 and 18 so that the flats on the bridge section 20 and connecting portions of the legs 16 and 18 are openly exposed to the direct blows of a hammer or the forces of a press which are used to drive the staple into another object. When the end portions 22 and 24 engage the other object, the driving forces, required to penetrate the legs 16 and 18 further, increase significantly so that the end portions 22 and 24 serve as indicators of the fully anchored condition of the staple and help to prevent a conduit captured by the legs and bridge section from being crushed by excessive driving forces.

Figure 2:
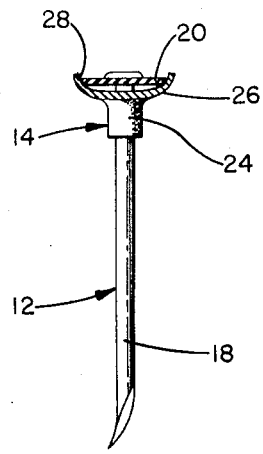
FIG. 2 is a cross sectional view of the insulated staple as seen along the sectioning line 2—2 of FIG. 1.

As seen most clearly in FIG. 2, the opening 28 in the intermediate portion 26 of the tubing 14 is cut so that the bridge section 20 is partially enveloped by insulating material and only the outer periphery of the U-shaped body member is exposed. The inner periphery and the lateral edges of the bridge section 20 are covered so that in cases, for example, where the conduit is supported in festoons or is otherwise bent over the bridge section 20, there is no point where the metallic body member 12 and the conduit can make contact. The tubing 14, therefore, lines the body member 12 along its inner periphery and also at other parts that might be contacted by a conduit and insures ideal insulating characteristics.

Figure 3:
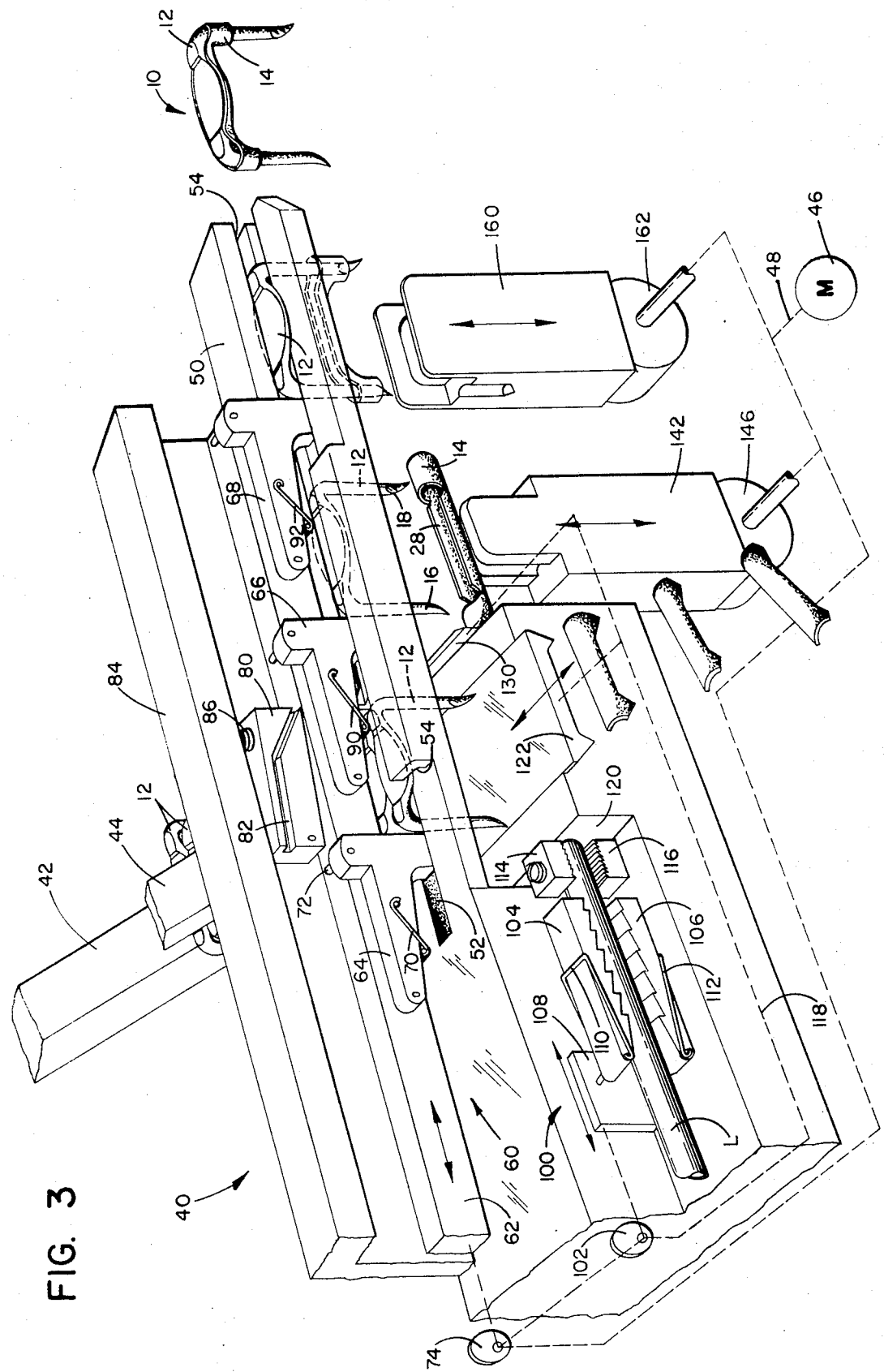
FIG. 3 is a fragmentary perspective view of the apparatus of the present invention in one embodiment with selected portions shown schematically and other portions removed for clarity.

In FIG. 3, apparatus according to the present invention is shown in a perspective view. The apparatus generally designated 40, installs the sections of tubing 14 on the conventional, metallic body members 12 in a series of steps synchronized in timed relationship so that the installation procedure can be carried out in a cyclic operation. The U-shaped body members 12 are serially fed to the apparatus 40 along an inclined, vibrating bar 42 from a feed bowl or other machine. Other suitable means for feeding the body members into the apparatus may be substituted for the inclined bar, if desired. The body members 12 straddle the bar 42 and are held in serial alignment by a stationary keeper 44 overlying the inclined bar 42 in parallel relationship. The tubing which is to form the insulation on the body members is introduced into the apparatus 40 as a continuous length of tubing L from a roll or coil of the tubing mounted adjacent the apparatus 40. Having received both the body member 12 and the continuous length of tubing L, the apparatus 40 performs all subsequent operations necessary to install sections of the tubing on the body members so that a complete, insulated staple 10 is discharged from the machine as shown at the right-hand side of FIG. 3. All of the components of the apparatus 40 are operated by a common drive motor 46 and an interconnecting drive linkage 48 so that the components operate through their individual operating cycles in synchronism with one another and permit the apparatus 40 to produce a complete insulated staple 10 during each operating cycle of the apparatus at a rate determined by the speed of the drive motor 46.

Turning first to the handling of the body members 12 within the apparatus 40, it will be seen that as the body members slide off of the vibrating bar 42, they are received in a feed or guide bar 50 and are captured in cruciformed slots within the bar. The legs of the body members 12 project downwardly through the vertical slot 52 through the bar 50 and the lateral edges of the bridge sections are captured within a horizontal slot 54 so that the body members are suspended penduously from the bar and can be pushed longitudinally along the bar in serial relationship with the depending ends of the legs exposed.

A reciprocating feed mechanism 60 indexes the body members 12 between each of the positions shown along the feed bar 50 in FIG. 3 and discharges the assembled staple 10 at the right-hand end of the bar. The feed mechanism 60 includes a slide 62 to which a plurality of feed dogs 64, 66 and 68 are pivotally connected for rotation on the slide and translation with the slide along the feed bar 50. The feed dog 64 has a depending finger portion which projects downwardly into the vertical slot 52 at the trailing leg of the body member and the dog 64 is urged downwardly into the position indicated by a torsion spring 70 connected between the slide 62 and the dog 64. A stop pin 72 projects laterally from the dog 64 over the upper surface of the slide 62 and limits the downward displacement of the dog to the position shown wherein the pin 72 rests on the upper surface of the slide 62 and the depending finger portion projects into the slot 52 behind a body member 12.

As the slide 62 is pushed horizontally to right in FIG. 3 by a cam 74 or a similar displacement device connected to the drive linkage 48, the depending finger portion on the dog 64 pushes the newly received body member 12 to the next adjacent index position which is the first assembling station for the body member 12 and the section of tubing 14. As the dog 64 advances a body member to the first assembling station, the next incoming body member falls into the slot 52 behind the depending finger portion. In order to reposition the dog 64 behind the incoming body member in preparation for the next indexing cycle, a lifting cam 80 having a cam slot 82 is mounted pivotally to the stationary frame 84 adjacent the slide 82. A biasing spring 86 is interposed between the lifting cam 80 and the frame 84 so that the limit pin 72 on the dog 64 can slide under and lift the cam 80 which is held against the top of the slide 62 by the biasing forces of the spring 86. When the reciprocating slide 62 returns the dog 64 to the position shown, the pin 72 engages the cam slot 82 and lifts the depending finger portion of the dog 64 out of the vertical slot 52 in the bar 50 to clear the incoming body member 12 which has fallen into the bar behind the dog. As the pin 72 leaves the left-hand end of the cam slot 82 on the return stroke of the slide, the finger portion of the dog 64 drops again into the slot 52 at the trailing leg of the body member 12 in preparation for the next indexing operation.

The feed dogs 66 and 68 have basically the same construction as the feed dog 64 and include depending finger portions which are urged downwardly into the vertical slot 52 by means of biasing springs 90 and 92 respectively. Since the body members 12 at the two index positions in the bar 50 adjacent the right-hand end of the bar are held by other means described hereinafter and, because the trailing edges of the finger portions are bevelled, the body members themselves cause the dogs 66 and 68 to be lifted as the slide 62 moves to the left on the return stroke. The feed dog 66 indexes the body members with the sections of tubing 14 along the bar 50 from the first assembling station to a second assembling station and the feed dog 68 moves the body members and tubing from the second assembling station out of the end of the feed bar 50 where the staple falls into a discharge chute or a hopper for subsequent packaging or other operations.

A feed mechanism 100 coordinates the movement of the length of tubing L into the apparatus 40 with the movement of the body members 12 along the feed bar 50 by the feed mechanism 60 so that a section of tubing 14 is prepared and delivered to the first assembling station for installation at the same time that a body member 12 arrives at the assembling station. The feed mechanism 100 is shown as a reciprocating hitch feeder driven in synchronism with the feed mechanism 60 by means of a cam 102 or other reciprocating drive connected to the linkage 48 and the drive motor 46. The hitch feeder includes two jaws 104 and 106 pivotally connected to a slide block 108 which is reciprocated parallel to the length of tubing L by means of the cam 102. The jaws 104 and 106 are positioned respectively above and below the length of tubing L and are urged into engagement with the length of tubing by torsion springs 110 and 112 respectively. A pair of spring-loaded clamping blocks 114 and 116 are mounted to a housing 118 on which the slide block 108 reciprocates so that the blocks 114 and 116 hold the length of tubing L while the jaws 104 and 106 are pulled to the left on the return stroke of the slide block 108, and release the tubing so that it can be advanced to the right into a through-passageway in a die 120 when the slide block 108 translates the jaws 104 and 106 toward the die 120. The cyclic reciprocation of the hitch feeder, therefore, periodically indexes a length of tubing into the passageway in the die 120. The rates of reciprocation of the slide block 108 and the slide 62, which advances the body member 12, are the same and the stroke of the slide block 108 is the same as the length of the section of tubing 14 which is to be installed on a body member.

The hitch feed mechanism 100 advances the length of tubing into a punch and die cutter comprising in part the die 120 defining the through-passageway into which the tubing is fed and a reciprocating cutting punch 122. The cutting punch 122 slides in a channel in the die 120 along an axis of reciprocation transverse to the through-passageway in the die and offset from the central axis of the passageway. The punch 122 reciprocates back and forth across the passageway and cuts a longitudinally extending wall portion from one side of the tubing positioned in the passageway. Several such wall portions are shown being expelled from the die in FIG. 3.

The cutting punch 122 is reciprocated in the die 120 by means of a cam, such as cam 102 or other reciprocating linkage, connected to the linkage 48 and drive motor 46. The reciprocations of the cutting punch 122 and the slide block 108 of the hitch feeding mechanism 100 are synchronized so that the cutting punch is retracted from a position overlying the through-passageway as the jaws 104 and 106 advance the tubing through the die 120, and the cutting punch is extended while the clamping blocks 114 and 116 hold the tubing and the jaws 104 and 106 are retracted on a return stroke to the left for feeding the next section of tubing into the die 120.

The axis of reciprocation passing through the centroid of the cutting punch 122 as viewed in cross section in FIGS. 4 and 6 is offset from the axis of the tubing within the die 120. The cutting punch 122 is shaped so that the longitudinal wall portion removed from the tubing has a greater circumferential dimension adjacent the longitudinal ends of the wall portion than at its midpoint and, correspondingly, the longitudinal opening 28 formed in the section of tubing after the wall portion is removed is more narrow at its midpoint than adjacent the longitudinal ends of the opening. In the preferred form of the punch and die cutter shown in the drawings, the cutting punch cuts into the central axis of the section of tubing 14 so that the width of the opening transverse to the tube axis and adjacent the longitudinal ends of the opening is at one point equal to the inside diameter of the tubing, the maximum width possible, and the width at the longitudinal midpoint of the opening is less than the width adjacent the longitudinal ends of the opening. Also, the punch 122 forms a longitudinal opening having a longitudinal dimension corresponding substantially to the spacing between the parallel legs of the body member 12. Such a configuration of the longitudinal opening formed by the punch 122 offers several advantages. As a principal advantage, it is apparent that by removing a wall portion which is narrow at its midpoint, a greater portion of the tubing section is available to wrap around and partially envelope the bridge section of the body member to provide insulating properties at all portions of the body member except those regions which are least likely to come in contact with a conduit and which are preferably exposed to the direct blows of the hammer or other mounting device.

After the section of tubing 14 is cut by the punch 122, the punch is withdrawn from its intersecting relationship with the through-passageway in the die 120 holding the tube section, and the hitch feeder mechanism 100 advances the tubing section further to the right, as viewed in FIGS. 3, 4 and 6 out of the passageway in the die 120. A cutting knife 130 is reciprocated transversely of the section of tubing 14 adjacent the end of the die 120 by means of a linkage that is common to the drive linkage for the cutting punch 122. Therefore, as the cutting punch 122 reciprocates across the next adjacent section of tubing 14 within the die 120 during the following reciprocation cycle, the cutting knife 130 severs a section of tubing 14 from the section in the die and the length of tubing L in the hitch feeder mechanism 100.

Figure 5:
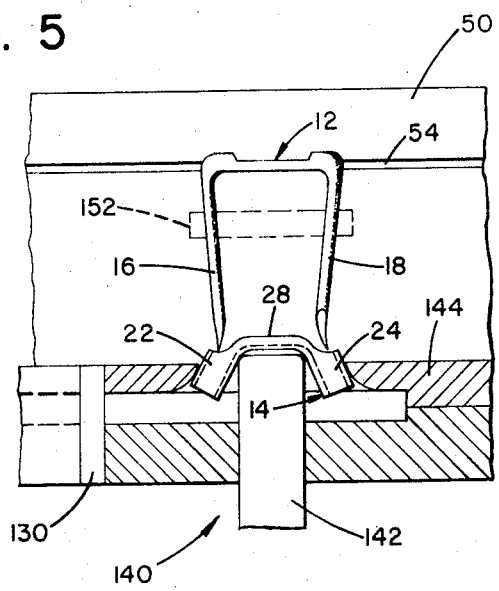
FIG. 5 is a fragmentary side elevation view of the bending die in FIG. 4 at another stage of the operating cycle.

When a section of tubing 14 is severed by the knife 130, it is located in a bending mechanism 140 shown more completely and at different stages of its operating cycle in FIGS. 4 and 5 and 6. The bending mechanism 140 aids in carrying out the installation operation at the first assembly station along the feed bar 50 by first bending the section of tubing 14 as shown in FIG. 5 and then pushing the bent axial end portions of the tubing onto the depending ends of the legs 16 and 18 as shown in FIG. 6. The bending mechanism comprises principally a bending punch 142 and a bending die housing 144 defining a punch guide channel contiguous with the through-passageway in the cutting die 120 so that the section of tubing 14, prior to being severed by the knife 130, is shifted axially into the housing 144 with an orientation locating the opening 28 at the upper side of the tubing while the knife 130 is retracted from the feed path for the tubing between the die 120 and die housing 144. The passageways within the die 120 and die housing 144 are, therefore, coaxial and, furthermore, the axis of the passageways is oriented at a slight angle, for example 20°, to the direction of the feed bar 50 as shown in FIG. 3. For simplicity, the angular relationship is not shown in the schematic views of FIGS. 4, 5 and 6. The angular relationship is desirable since it makes possible the most favorable relative positioning of the body member 12 and the section of tubing 14 as they are brought together for the first time at the first assembling station. It will be noted that the pointed ends of the legs 16 and 18 are formed by oppositely facing sheer planes so that the points at the ends of the legs do not lie precisely along a line lying within the general plane of the U-shaped body member 12, but lie instead along a line which is oriented at a slight angle to the plane of the body member. With the angular relationship of the passageways and the feed bar, the points of the legs 16 and 18 register more precisely with the ends of the longitudinal opening 28 and the assembling operation described below is more easily carried out.

The bending punch 142 having a peripheral groove extending over the upper end is reciprocated vertically through the horizontal guide channel in the die housing 144 by means of the drive cam 146 connected to the linkage 48 and the drive motor 46. The die housing 144 bears an opening or slot 148 at its upper side which flares downwardly from the exterior of the housing into the horizontal guide channel in which the section of tubing 14 is received from the die 120. The slot 148 is a longitudinal slot extending along the top one side of the guide channel parallel with the tubing section within the die housing 144 and, since the severing of the tubing by the knife 130 is not accomplished until after the tubing is shifted into the die housing 144, the tube opening 28 will be contiguous with the slot 148. The knife 130 during the severing operation also shifts the tubing section incrementally by an amount equal to the width of the knife into a centered position below the slot 148. The length of the slot is less than the length of the section of tubing in the die housing 144 and is approximately equal to the longitudinal length of the opening 28 in the section of tubing. When the bending punch 142 is stroked upwardly through the slot 148 as indicated in FIG. 5, the section of tubing 14 is received in the peripheral groove and is bent in a U-shaped configuration corresponding to the shape of the body member 12 so that the respective axial end portions 22 and 24 and the longitudinal ends of the opening 28 are substantially aligned with the legs 16 and 18 of the body member 12. It should be noted that the bending mechanism 140 cooperates with the feed mechanisms 60 and 100 to move the body members 12 and sections of tubing 14 respectively along two feed paths intersecting at the first assembling station along the feed bar 50 and brings the members and tubing together at the first assembling station at the appropriate time during each operating cycle of the apparatus 40. The common drive motor 46 and cams which actuate the feed mechanisms and cooperating bending mechanism insure that the members 12 and the tubing 14 are brought together at the same time during each operating cycle.

As the bending punch 142 reciprocates upwardly and carries the bent tubing section in its peripheral groove, the pointed ends of the legs 16 and 18 are inserted through or enter respectively the opposite longitudinal ends of the opening 28 and pass respectively through the axial end portions 22 and 24 of the tubing 14. As seen in FIG. 6, the bending punch 142 has reached the upper limit of its stroke and the tubing 14 is positioned on the body member 12 in a U-shaped configuration corresponding to that of the body member with the longitudinal opening 28 facing away from the pointed ends of the legs 16 and 18.

Figure 7:
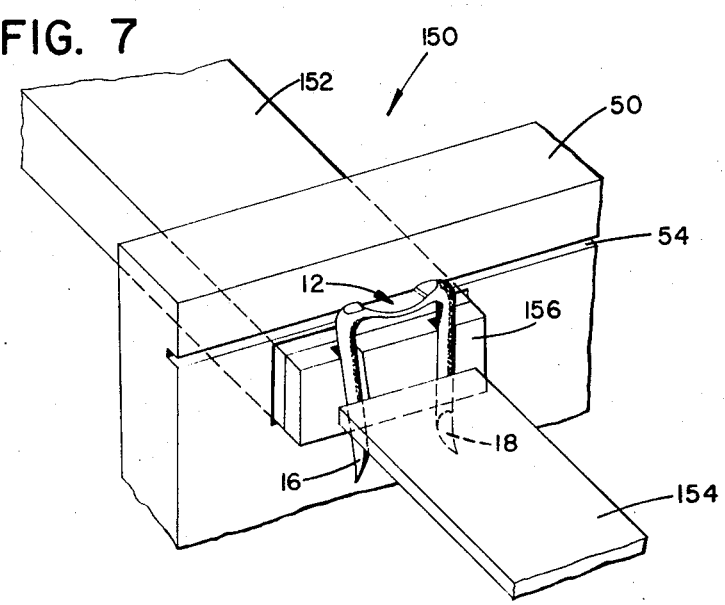
FIG. 7 is a fragmentary perspective view of the clamping mechanism at the first assembling station.

In order to insure that the depending tips of the legs 16 and 18 are accurately positioned over the center line of the slot 148 during each installing operation, a clamping mechanism 150 as shown in perspective in FIG. 7 is mounted in the feed bar 50 at the first assembling station. The clamping mechanism 150 is comprised of a reciprocating jaw 152 mounted at one side of the bar and a fixed jaw 154 mounted in the other side of the bar (removed for clarity). The jaw 152 has an axis of reciprocation oriented perpendicular to the feed bar 50 and contains a vertically slotted clamping member 156 which engages the body member 12 and pushes it tightly against the fixed jaw 154 so that the vertical alignment of the member 12 and the tubing is fixed by the bending punch 142 and the jaws 152 and 154. The closing motion of the jaws 152 and 154 occurs during the operating cycle immediately preceding the time when the bending punch 142 raises the section of tubing 14 and slides the section onto the depending ends of the legs 16 and 18. Of course, it will be recognized that if the cruciform slots 52 and 54 hold the body member 12 accurately, the clamping mechanism 150 may not be needed. It will also be understood that by cutting the longitudinal opening 28 in the tubing 14 as described above so that the widest dimensions of the opening lie at the longitudinal ends where the legs 16 and 18 first enter the tubing, the alignment of the body member and tubing 14 becomes less critical.

With the tubing 14 installed on the lower portion of the legs 16 and 18 of the body member 12 as shown in FIG. 6, the staple 10 could be ejected from the apparatus 40 without further assembling operations. However, since it would be possible for the section of tubing 14 at the lower position to easily slip off the legs, a second reciprocating punch 160 driven through a cam 162 and the drive motor 46 pushes the tubing further upwardly on the body member 12 at the second assembling station adjacent the right-hand end of the feed bar 50. The punch 160 must operate at a specific time during the operating cycle of the apparatus 40 after the body member 12 has been indexed to the second assembling station on the feed bar 50. With the tubing 14 already mounted on the legs 16 and 18, there is no necessity to employ a clamping mechanism and the horizontal slots 54 in the bar 50 engaging the bridge section 20 of the body member 12 are sufficient to hold the body member as the punch 160 slides the tubing further onto the legs 16 and 18.

After the punch 160 has returned to its lower position, the feed dog 68 moves to its phantom position indicated in FIG. 6 and discharges the assembled body member 12 and the tubing 14 as an insulated staple 10 at the end of the bar 50. In this respect it will be observed that the two body members 12 adjacent the end of the feed bar 50 can be operated upon by the punches 142 and 160 during the same interval of the operating cycle of the apparatus 40 so that a common cam or other device can be employed to reciprocate the punches if desired. During such interval the cutting punch 122 also cuts through the section of tubing in the die 120 and the dog feed mechanism 60 and hitch feed mechanism 100 are stroked to the left in preparation for the next indexing operation. Since the body members 12 adjacent the end of the bar 50 are captured by the slot 54 and the punches 142 and 160 during this interval, lifting cams are not required for the feed dogs 66 and 68 providing that the trailing edges of the depending finger portions are beveled to generate the necessary lifting forces in conjunction with the captured body members.

It will be understood that the apparatus 40 is a cyclically operating apparatus and that a single insulated staple 10 is produced during each operating cycle. The individual components of the apparatus 40, that is the feed mechanisms 60 and 100, the cutting punch 122, the bending mechanism 140 and the final assemby punch 160 operate at the same cyclic rate as the apparatus itself, but since portions of the assembly operations for different staples are carried out simultaneously, a completely assembled staple 10 is discharged from the apparatus 40 during each operating cycle.

Figure 9:
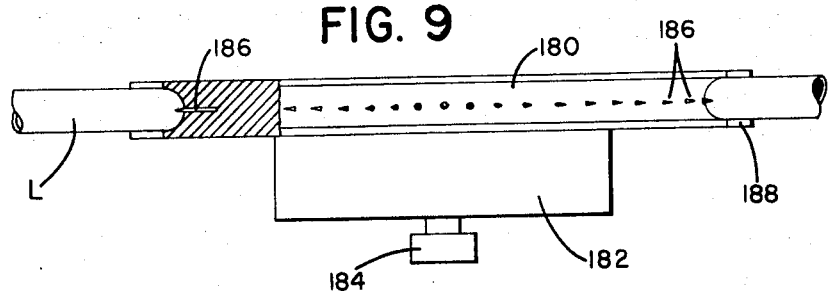
FIG. 9 is a top plan view of the alternate feed mechanism in FIG. 8.
Figure 8:
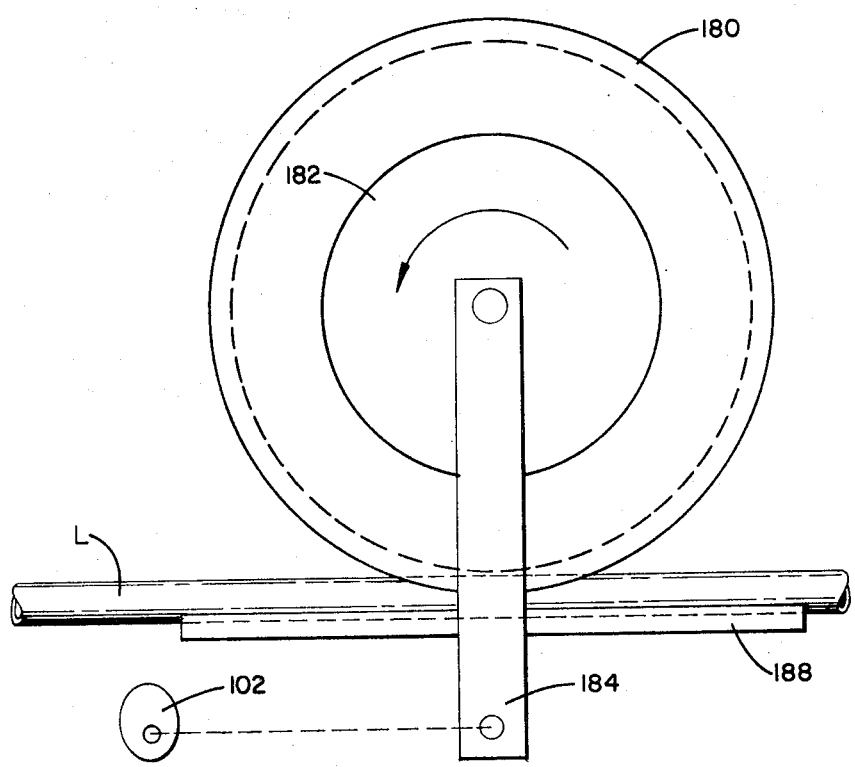
FIG. 8 is a side elevation view of an alternate feed mechanism comprising an indexing wheel which can be substituted for the hitch feed mechanism.

While the present invention has been disclosed in a preferred embodiment, it will be understood that numerous modifications and substitutions can be made to the individual components of the apparatus without departing from the spirit of the invention. For example, although a hitch feeder has been shown as feeding the continuous length of tubing into the apparatus 40, equivalent indexing mechanisms can be substituted. By way of example, an indexing wheel 180 shown in FIGS. 8 and 9 may be connected by a one-way clutch 182 and an oscillating crank 184 to the reciprocating linkage including cam 102 so that the periphery of the wheel is indexed in the direction shown by the arrow an amount equal to the length of a section of tubing 14 during each rotation of the cam. The periphery of the wheel 180 contains a peripheral groove and a plurality of teeth or pins 186 and cooperates with a stationary, grooved guide block 188 to engage the length of tubing L and slide the tubing incrementally over the grooved guide block 188 along the feed path into the die 120. The feed dogs 64, 66 and 68 can also be replaced by equivalent feeding means for indexing the body members 12 between the input and several assembly stations. In certain embodiments of the apparatus, the punch 120 and die 122 can be deleted and the bending mechanism 140 can be utilized to pierce the pointed legs of the body member 12 through the wall of tubing as the tubing is bent in the U-shaped configuration in FIG. 5. The resulting insulated staple has the axial end portions of the tubing segment mounted coaxially about the legs of the body member as in FIG. 1 and the intermediate portion of the tubing section lies wholly below the bridge section 20 and provides a complete tubular lining or cushion and a double thickness of insulation under the bridge section. It is also possible that still further punching mechanisms can be connected to the apparatus adjacent the punch 160 so that the section of tubing 14 can be fully seated on the body member 12 when the staple is discharged from the apparatus. In its present form, the apparatus 40 discharges the staple 10 with the section of tubing 14 located on the depending legs 16 and 18 of the body member at a position in which the tubing is not completely seated against the bridge section 20. This installation of the tubing, however, does not interfere with the intended use of the staple since the actual seating operation takes place when the staple is driven into a supporting object while straddling a supported conduit and the conduit itself forces the intermediate portion 26 of the tubing 14 into its final, seated position partially enveloping the bridge section 20 of the body member 12. The common drive linkage 48 and the drive cams which generate the reciprocating motions of the cooperating feeding mechanisms and the punches can be replaced with crank linkages where specially modulated motions are not required. Accordingly, the present invention has been described in a preferred embodiment by way of illustration rather than limitation.

We claim:

1. Apparatus for insulating U-shaped body members to form insulated staples comprising: first feed means defining a first feed path for serially transferring a U-shaped body member along the first feed path; second feed means defining a second feed path intersecting the first feed path for moving flexible insulating tubing toward the point of intersection of the first and second paths; cutting means located along the second path in advance of the point of intersection for removing a longitudinal wall portion from the tubing to generate a longitudinal opening at one side of the tubing; severing means located along the second feed path for cutting the tubing into a section of a predefined length with the longitudinal opening located between the opposite axial ends of the section; and assembling means located at the intersection of the two feed paths for installing the section of flexible tubing on the parallel legs of a U-shaped body member with the parallel legs extending into the longitudinal opening from the one side of the tubing and respectively out of the opposite axial ends of the tubing section.

2. Apparatus for insulating the U-shaped body members as defined in claim 1 wherein: the second feed means comprises a hitch feeding mechanism having two tube-engaging jaws mounted in opposed relationship at opposite sides of the second feed path, and a reciprocating drive linkage connected to the two jaws.

3. Apparatus for insulating the U-shaped body members as defined in claim 1 wherein the cutting means comprises a die having a tube-receiving passageway defining a portion of the second feed path and a reciprocating punch slidably mounted in the die and reciprocable along an axis transverse to the tube-receiving passageway.

4. Apparatus for insulating the U-shaped body members as defined in claim 1 wherein the assembling means includes bending means for receiving the section of flexible tubing and bending the tubing in a U-shaped configuration corresponding to the shape of the body member; and the first feed means includes supporting means at the intersection of the first and second feed paths for holding a body member with the parallel legs projecting freely toward the bent section of tubing.

5. Apparatus for insulating the U-shaped body members as defined in claim 4 wherein the bending means comprises a bending die housing having an elongated passageway axially aligned with the second feed path and into which the section of tubing is fed by the second feed means, the passageway also including a longitudinal slot at one side having a length less than the predefined length of the section of tubing; and wherein the bending means also includes reciprocating punch means having an axis of reciprocation extending transversely of the passageway in the die housing and through the longitudinal slot for forcing a section of flexible tubing axially aligned in the passageway of the housing through the longitudinal slot in a U-shaped configuration toward the projecting legs of a body member in the supporting means.

6. Apparatus for insulating the body members as defined in claim 5 wherein the cutting means comprises a die defining an elongated passageway coaxially alinged with the second feed path and the elongated passageway of the bending means; and the severing means includes a reciprocating knife blade having an axis of reciprocation intersecting the second feed path at a point between the die of the cutting means and the housing of the bending means.

7. Apparatus for installing insulating sleeves on staples having a U-shaped body member including spaced and parallel legs joined by a bridging section, comprising: cutting means for removing a longitudinally extending wall portion from an insulating sleeve to form a longitudinal opening on one side of the sleeve, the opening having a longitudinal dimension not substantially less than the spacing of the parallel legs; bending means connected to the cutting means to receive a cut sleeve for bending the sleeve into a U-shaped configuration corresponding to the U-shaped body member with the longitudinal opening located at the outer periphery of the sleeve in the bent configuration; cooperative feeding means for simultaneously advancing a U-shaped body member and a sleeve to an assembling station with the projecting ends of the parallel legs adjacent the longitudinal opening and registering respectively with the axial ends of the sleeve; and assembling means at the assembling station for urging the projecting ends of the parallel legs through the longitudinal opening and out through the respective axial ends of the sleeve.

8. Apparatus for installing insulating sleeves as defined in claim 7 wherein the cutting means comprises a punch and die cutter having a die defining a through-passageway for receiving and expelling the sleeve and a reciprocating cutting punch reciprocable relative to the passageway along an axis transverse to the passageway.

9. Apparatus as defined in claim 8 wherein the axis of reciprocation of the cutting punch is offset from the central axis of the through-passageway in the die and the cutting punch is shaped to cut more deeply into the sleeve adjacent the longitudinal ends of the opening than at the midpoint of the opening.

10. Apparatus for installing insulating sleeves as defined in claim 7 wherein the bending means is comprised of a bending punch and a die housing having a punch guide channel transversely intersecting a sleeve-receiving passageway into which a sleeve is axially shifted in a specified position from the cutting means, the housing also defining a slot leading from the exterior of the housing to the passageway in the interior of the housing, the slot having a longitudinal dimension less than the length of a sleeve accommodated by the passageway and being located in alignment with the punch guide channel and adjacent the longitudinal opening of a sleeve received in the passageway in the specified position.

11. Apparatus for installing insulating sleeves as defined in claim 7 wherein the bending means comprises a bending die housing connected contiguously to the cutting means and a reciprocating bending punch mounted in the die housing and operatively connected with the cutting means for synchronized cutting and bending operations.

12. Apparatus for installing insulating sleeves as defined in claim 11 wherein the reciprocating bending punch has one end bearing a peripheral groove extending over the one end in intersecting relationship with the axis of reciprocation of the punch.

13. Apparatus as defined in claim 7 further including tubing supply means for supplying a continuous length of tubing and tube sectioning means cooperating with the supply means for cutting the continuous length of tubing into sleeves of a pre-defined length.

14. Apparatus as defined in claim 13 wherein the tubing supply means, the cutting means and the tube sectioning means define a continuous feed path for receiving the length of tubing; the tubing supply means includes a hitch feeder; the cutting means comprises a cutting punch and die; and the tube sectioning means includes a knife blade connected for synchronous operation with the cutting punch and located along the continuous feed path at a side of the die opposite from the hitch feeder of the tubing supply means.

15. Apparatus for installing insulating sleeves as defined in claim 7 wherein the cooperative feeding means comprises reciprocating feed means for serially advancing the U-shaped body members to the assembling station with the projecting ends of the legs freely exposed.

16. Apparatus for installing insulating sleeves as defined in claim 15 wherein the bending means comprises a die housing and a reciprocating punch mounted in the housing adjacent the assembling station and on which the sleeve is formed in the bent condition; and the reciprocating feed means has a guide bar from which the body members are suspended with the legs freely exposed and which bar extends in adjacent relationship with the reciprocating punch of the bending means at the assembling station.

17. Apparatus as defined in claim 16 wherein the assembling means includes the reciprocating punch of the bending means and the guide bar of the reciprocating feed means and further includes clamping means positioned along the guide bar at the assembling station for holding the staple body member as the legs are urged through the axial ends of the sleeve.

18. Apparatus for insulating U-shaped body members having two parallel legs connected by a bridge section to form insulated staples comprising: first feed means defining a first feed path for transferring the U-shaped body members in serial relationship to a first assembling point along the first feed path; second feed means defining a second feed path intersecting the first feed path at the assembling point for advancing insulating tubing toward the assembling point; severing means for cutting the insulating tubing into sections of tubing having a predefined length less than the combined length of the two legs and bridge section of the body member; and assembling means at the assembling station for installing a section of tubing on the body member with the axial end portions of the section of tubing positioned coaxially on the respective parallel legs and exposing the free ends of the legs, and the intermediate portion of the section of tubing adjacent the bridge section.

19. Apparatus for insulating U-shaped body members as defined in claim 18 wherein the assembling means comprises a bending die housing having a passageway on the second feed path and accommodating the insulating tubing, and a bending die punch reciprocable transversely through the passageway of the housing.

20. Apparatus for insulating U-shaped body members as defined in claim 19 wherein the severing means is positioned along the second feed path in advance of the assembling means at the intersection of the first and second feed paths whereby the bending die housing receives the severed sections of tubing in the passageway.

21. Apparatus for insulating U-shaped body members as defined in claim 18 wherein the second feed means comprises an indexing wheel and a guide block adjacent the second feed path and cooperating with the periphery of the wheel to incrementally advance the insulating tubing along the second feed path.

* * * * *